United States Patent [19]
Goh et al.

[11] Patent Number: 5,529,474
[45] Date of Patent: Jun. 25, 1996

[54] SYSTEM FOR PREHEATING A MOLDING COMPOUND

[75] Inventors: Jing S. Goh; Chee C. Lau, both of Singapore, Singapore

[73] Assignee: Texas Instruments Incorporated, Dallas, Tex.

[21] Appl. No.: 397,019

[22] Filed: Mar. 1, 1995

Related U.S. Application Data

[60] Continuation of Ser. No. 160,371, Nov. 29, 1993, abandoned, which is a division of Ser. No. 951,643, Sep. 25, 1992, abandoned.

[51] Int. Cl.$^6$ ................................................. B29C 45/72
[52] U.S. Cl. ................... 425/174.6; 264/272.14; 264/272.17; 264/328.14; 264/449; 425/572
[58] Field of Search ................... 264/27, 272.14, 264/272.17, 328.4, 328.5, 328.14; 425/130, 174.6, 588, 572

[56] References Cited

U.S. PATENT DOCUMENTS

| | | | |
|---|---|---|---|
| 3,320,397 | 5/1967 | Alexander et al. | 264/328.5 |
| 3,473,196 | 10/1969 | Hull et al. | 264/328.5 |
| 4,517,078 | 5/1985 | Inculet | 209/127 |
| 4,569,814 | 2/1986 | Chong | 264/328.5 |
| 4,862,245 | 8/1989 | Pashby et al. | 357/70 |
| 4,916,519 | 4/1990 | Ward | 357/70 |
| 4,927,590 | 5/1990 | Poelzing | 264/328.5 |
| 4,965,654 | 10/1990 | Karner et al. | 357/70 |

FOREIGN PATENT DOCUMENTS

| | | | |
|---|---|---|---|
| 56-104016 | 8/1981 | Japan | 264/328.4 |
| 61-85830 | 5/1986 | Japan | 264/328.5 |

OTHER PUBLICATIONS

Webster's Ninth New Collegiate Dictionary, p. 190 1986.
Alec Broers, "Choices for Tomorrow's Chips", *New Scientist*, pp. 23–27, Apr. 1992.
William C. Ward, "Volume Production of Unique Plastic Surface–Mount Modules for the IBM 80–ns 1Mbit DRAM Chip by Area Wire Bond Techniques" (IBM General Technology Division, Essex Junction, Vermont 05452, *IEEE* (569–5503/88/0000–0552), pp. 552–557.

*Primary Examiner*—Tim Heitbrink
*Attorney, Agent, or Firm*—Paul C. Hashim; Wade J. Brady, III; Richard L. Donaldson

[57] ABSTRACT

A system (30) and method for preheating molding compound in the form of resin pellets (20) used in molding integrated circuits (50). A slanted plate (36) is connected to an electrode (31) to preheat resin pellets (20). The slanted plate (36) produces a temperature gradient in pellets (20) with a high temperature end (21) and a lower temperature end (22). A preheated pellet (20) with the lower temperature end (22) first is placed in a mold pot (40). A transfer ram (46) contacts the high temperature end (21) of the pellet (20) to deform the pellet (20) and fill any void spaces between the pellet (20) and surrounding mold pot bushing (44). The ram (46) continues to deform the pellet (20) to force air or other gases from the mold pot bushing (44) and to inject molding compound into a mold cavity (42).

11 Claims, 2 Drawing Sheets

SYSTEM FOR PREHEATING A MOLDING COMPOUND

This application is a Continuation of Ser. No. 08/160,371, filed Nov. 29, 1993 now abandoned, which is a Divisional of prior application Ser. No. 07/951,643, filed Sep. 25, 1992 now abandoned.

TECHNICAL FIELD OF THE INVENTION

This invention relates to integrated circuits, and more particularly relates to preheating and injecting molding compound used for packaging an integrated circuit into a finished product.

BACKGROUND OF THE INVENTION

Various techniques have previously been used to preheat molding compound in the form of resin pellets prior to injecting the molding compound into a mold cavity containing an integrated circuit. Initially, the resin pellets often have the general configuration of an elongated cylinder with dimensions selected to allow placing a preheated pellet into a mold pot. Generally, the mold pot includes a bushing which holds the preheated pellet while a transfer ram applies force to the pellet to inject molding compound into a mold cavity. Typically, a mold assembly including the mold pot and a mold die having main runners, secondary runners, mold gates, and multiple mold cavities is used to encapsulate integrated circuits. The portion of the mold die containing the mold cavities is sometimes referred to as the chase or mold chase.

Some preheat methods employ upper and lower electrodes which are spaced parallel to each other and preheat a resin pellet such that both ends have a higher temperature than the center of the pellet. When the preheated pellet is placed in the mold pot bushing and contacted by the transfer ram, the pellet will deform with the general cross-section of an hour glass or figure 8 having voids between the pellet and bushing. These voids often trap air or other gases as the transfer ram continues to apply force to the pellet and inject molding compound into a mold cavity.

Another technique for preheating a resin pellet uses a stepped plate in the center of the upper electrode to increase the temperature in the middle of the pellet. The temperature at both ends of the preheated pellet will then be less than the temperature at the center of the preheated pellet. This increased center temperature produces a preheated pellet having the general cross-section of a beer barrel when the transfer ram contacts the preheated pellet in a mold pot bushing. Again, void spaces result which often trap air or other gases as the transfer ram applies force to the pellet to inject molding compound into a mold cavity.

Prior molding techniques have generally worked satisfactorily in packaging previous integrated circuit designs. With the advent of more complex and smaller scale integrated circuits, increased importance has been placed on uniform encapsulation of the integrated circuit and its associated electrical components. Voids or trapped air in the molding compound frequently result in rejection of the finished product which substantially reduces the yield of a manufacturing facility producing complex integrate circuits.

A need has thus arisen for a molding process which properly preheats resin pellets to produce a uniform, consistent flow of molding compound throughout the molding process without entrapping air or other gases.

SUMMARY OF THE INVENTION

In accordance with the present invention, disadvantages and problems associated with previous transfer molding techniques for integrated circuit packaging have been substantially reduced or eliminated by use of the present invention. An integrated circuit and its associated lead frame are positioned within a mold cavity. Molding compound in the form of a resin pellet is first preheated and then injected from a mold pot into the mold cavity. The molding compound will encapsulate the integrated circuit with conductive leads extending therefrom to form a finished product.

In accordance with one aspect of the present invention, a slanted plate is provided to heat a resin pellet prior to placing the pellet into a mold pot. The slanted plate provides a preheated resin pellet having a higher temperature at one end and a lower temperature at the other end with a relatively uniform change in temperature from the one end to the other end of the pellet. The preheated pellet is then placed in a mold pot with the lower temperature end of the pellet first entering the mold pot. A transfer ram contacts the higher temperature end of the pellet within the mold pot and applies force to the pellet to inject molding compound from the mold pot into the mold cavity.

The present invention has significant technical advantages in that a resin pellet is preheated with one end having a higher temperature than the other end and a relatively uniform temperature gradient from the high temperature end to the low temperature end. The preheated pellet is placed in a mold pot bushing with the lower temperature end adjacent to outlets from the mold pot bushing and the higher temperature end adjacent to a transfer ram. As the transfer ram contacts the higher temperature end of the preheated pellet, the pellet is deformed to match the internal dimensions of the mold pot bushing and fill any void spaces between the pellet and the surrounding mold pot bushing. Deforming the preheated pellet in this manner insures that any air or other gas is forced out of the mold pot and is not trapped within the molding compound. As the transfer ram continues to apply force to the preheated pellet, the combination of mold pot temperature and ram force changes the pellet into viscous molding compound which is injected through runners at the end of the mold pot bushing into a mold cavity having an integrated circuit.

The present invention has another significant technical advantage in that a resin pellet is preheated with a slanted plate attached to an electrode which results in a high temperature end and a low temperature end on the resin pellet. The preheated resin pellet is placed in a mold pot and force applied from a transfer ram to assist with changing the resin pellet into viscous molding compound without trapping air or gases in the molding compound. The molding compound is then directed towards a mold cavity having an integrated circuit to form an encapsulated package without voids caused by entrapped air or other gases in the molding compound.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF THE INVENTION

The preferred embodiment of the present invention and its advantages are best understood by referring to FIGS. 1–7 of the drawings. Like numerals are used for like and corresponding parts in the various drawings.

Figure 1:
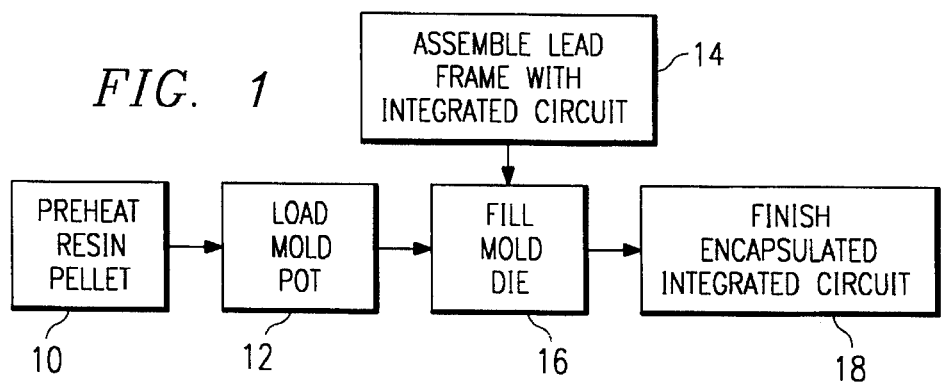
FIG. 1 is a block diagram of a transfer molding process using the present invention.
Figure 2:
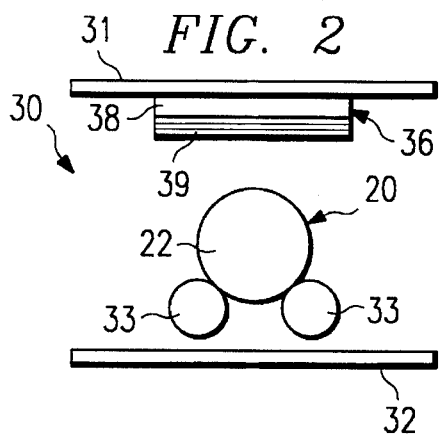
FIG. 2 is a schematic end view in elevation with portions broken away of a system for preheating resin pellets incorporating the present invention.
Figure 3:
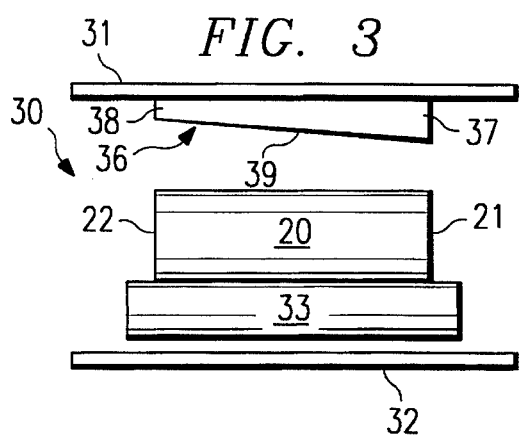
FIG. 3 is a schematic front view in elevation with portions broken away of the preheat system of FIG. 2.
Figure 4:
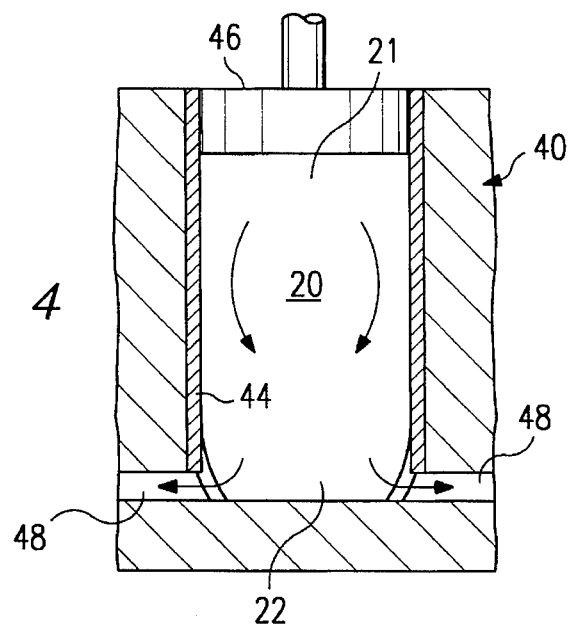
FIG. 4 is a schematic drawing, in section and elevation with portions broken away showing a resin pellet preheated in accordance with the present invention placed in a mold pot.
Figure 5:
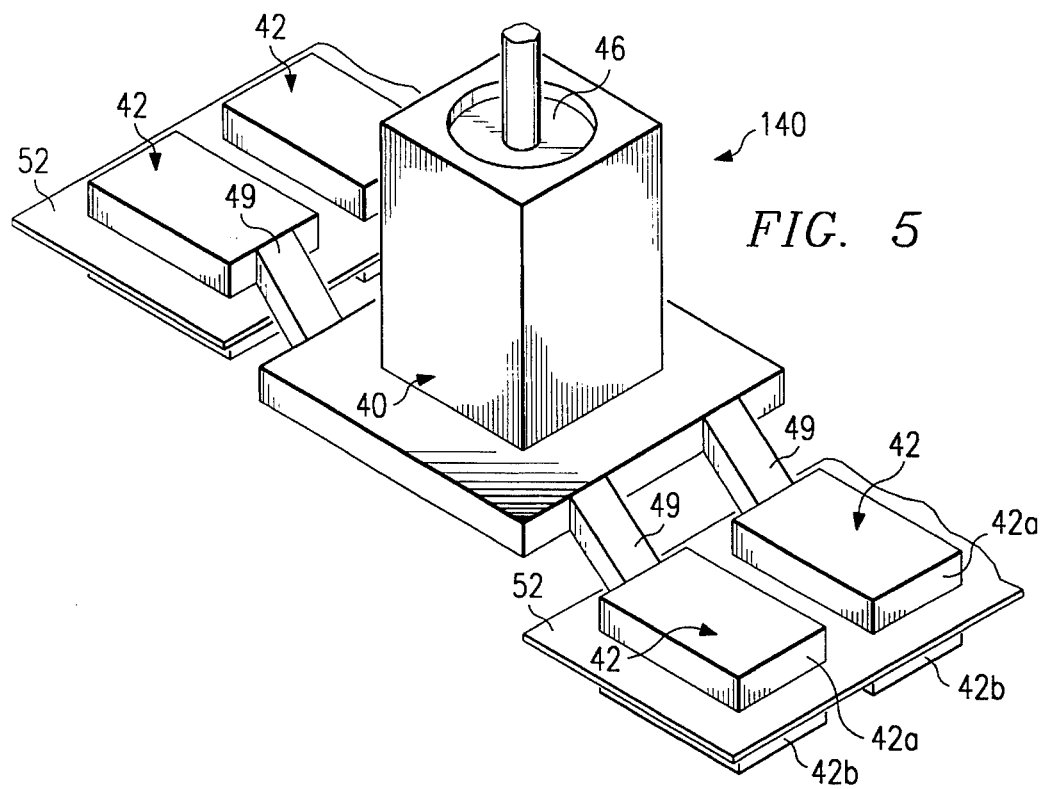
FIG. 5 is an isometric drawing with portions broken away showing a mold assembly having a mold pot and mold dies which may be used with the present invention.

FIG. 1 is a block diagram showing a typical transfer molding process which uses the present invention to encapsulate an integrated circuit into a finished product. First step 10 in the process is to preheat the molding compound in the form of resin pellet 20 (FIGS. 2–4). Novolac epoxy compound has been found to be a satisfactory resin for use in encapsulating integrating circuits. Other types of thermoplastic resin may also be satisfactorily used with the present invention. In step 10 resin pellet 20 is preheated to selected temperatures. The next step in the process represented by block 12 includes placing preheated resin pellet 20 in mold pot 40 (FIG. 4). Another step in this process represented by block 14 includes assembly of one or more integrated circuits 50 (FIG. 5) onto lead frames 52 (FIG. 5).

The next step in the process represented by block 16 includes placing a portion of each lead frame 52 and associated integrated circuit 50 within a plurality of mold cavities 42 and injecting molding compound from mold pot 40 into mold cavities 42. After the injection process has been completed and the molding compound allowed to solidify, mold cavities 42 are opened and lead frames 52 with their respective encapsulated circuits 50 removed. The final step in the process as represented by block 18 involves curing and deflashing plastic body 56. External leads 54 are trimmed and formed to produce finished product 60, an encapsulated integrated circuit.

Figure 6:
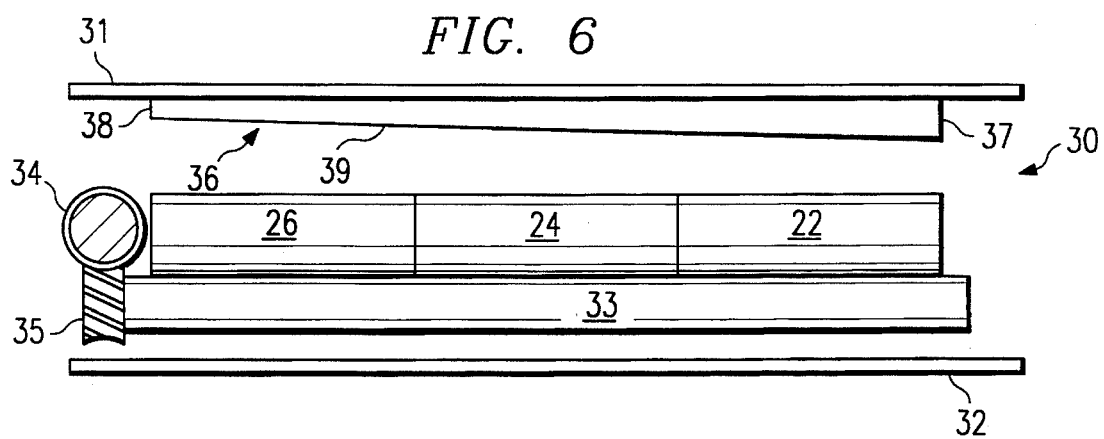
FIG. 6 is a schematic front view in elevation of a preheat system incorporating the present invention heating multiple resin pellets.
Figure 7:
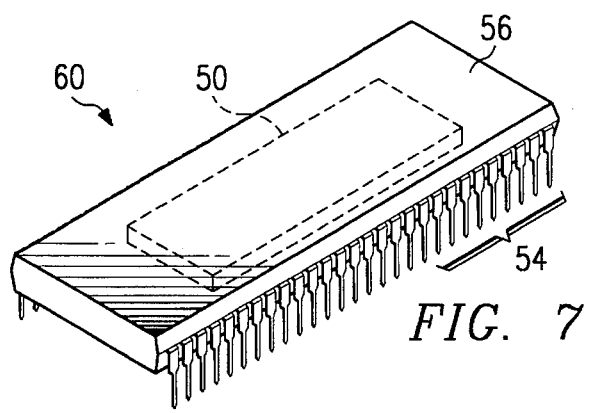
FIG. 7 is an isometric drawing of an integrated circuit which has been encapsulated using the present invention.

FIGS. 2, 3 and 6 show system 30 which incorporates the present invention for preheating resin pellets 20. Preheating system 30 includes upper electrode 31 and lower electrode 32 with a pair of rollers 33 disposed between electrodes 31 and 32. Preferably worm gears 34 and 35 are attached to rollers 33 to provide means for rotating resin pellet 20 resting on rollers 33. As best shown in FIG. 2 when rollers 33 are rotated by worm gears 34 and 35 pellet 20 will rotate between electrodes 31 and 32. The rate of rotation and the length of time resin pellet 20 is on rollers 33 may be varied to provide the desired temperature gradient within pellet 20.

Slanted plate 36 is attached to upper electrode 31 and represents an important feature of the present invention. As best shown in FIGS. 3 and 6, one end 37 of slanted plate 36 produces a smaller gap between upper electrode 31 and lower electrode 32 as compared to the other end 38 of slanted plate 36. Upper electrodes 31 and 32 produce an electromagnetic field which heats resin pellets 20. Tapered surface 39 which extends between ends 37 and 38 of slanted plate 36 produces a gradient in this electromagnetic field. The gradient in the electromagnetic field is proportional to the angle of tapered surface 39 relative to electrodes 31 and 32.

The gradient in the electromagnetic field between upper electrode 31 and lower electrode 32 produced by slanted plate 36 results in heating resin pellet 20 with a temperature gradient proportional to the angle of tapered surface 39 and the gradient in the electromagnetic field. One end 21 of resin pellet 20 between one end 37 of slanted plate 36 and lower electrode 32 will be heated to a higher temperature than the other end 22 adjacent to the other end 38 of slanted plate 36. Resin pellet 20 is preferably rotated between upper electrode 31 and lower electrode 32 during the preheat process to provide a relatively uniform radial distribution of temperature within resin pellet 20. Slanted plate 36 cooperates with electrodes 31 and 32 to produce a longitudinal gradient in the temperature between one end 21 and the other end 22 of resin pellet 20. The resulting longitudinal temperature gradient in resin pellet 20 is an important benefit of the present invention.

Preheating system 30 is used with mold assembly 140 as part of a low stress, transfer molding system to encapsulate integrated circuit 50. Mold assembly 140 includes mold pot 40, transfer ram 46, runners 48, mold gates 49 and mold cavities 42. As shown in schematic form in FIG. 5, each mold cavity 42 is further defined by mold chase 42a and 42b. Mold gates 49 cooperate with runners 48 to provide a fluid flow path from mold pot 40 to mold cavities 42.

When resin pellet 20 has been heated to the desired temperature, resin pellet 20 is placed in mold pot 40. Mold pot 40 preferably includes mold pot bushing 44 and transfer ram 46. A plurality of runners 48 extend from mold pot 40 to provide a fluid flow path from mold pot 40 to mold cavities 42. Preheated resin pellet 20 is preferably placed within mold pot bushing 44 with low temperature end 22 first. High temperature end 21 is thus positioned within mold pot bushing 44 for contact with transfer ram 46. An important feature of the present invention is positioning higher temperature end 21 for contact with transfer ram 46.

As transfer ram 46 contacts higher temperature end 21 of resin pellet 20, high temperature end 21 will deform to match the inside diameter of mold pot bushing 44. This deformation of preheated pellet 20 results in any air or gases trapped within mold pot bushing 44 and mold pot 40 being forced out through runners 48 without entrapping the air or gases in the molding compound represented by pellet 20. As increased force is applied to resin pellet 20, molding compound is then forced through runners 48 into the mold cavities 42. Mold pot 40, mold cavities 42, runners 48 and transfer ram 46 are preferably maintained at an elevated temperature which will cause resin pellet 20 to transform into amorphous, viscous molding compound which can be injected through runners 48 into mold cavities 42.

Depending upon the number and the volume of mold cavities 42, there may be a need to place more than one resin pellet into mold pot 40. FIG. 6 shows the present invention used to preheat three resin pellets 22, 24 and 26 which have been placed on rollers 33. Slanted plate 36 will cooperate with upper electrode 31 and lower electrode 32 to heat resin pellet 22 to a higher temperature than resin pellet 26. Resin pellet 24 will be heated to a temperature intermediate resin pellets 22 and 26. The temperature gradient between resin pellet 22, 24 and 26 is again proportional to the angle of tapered surface 39 between ends 38 and 37 of slanted plate 36.

After heating resin pellets 22, 24 and 26 to their respective desired temperatures, lower temperature pellet 26 is preferably inserted first into mold pot 40 followed by resin pellet 24 and resin pellet 22. Higher temperature resin pellet 22 is placed in mold pot bushing 44 last so that when transfer ram 46 contacts higher temperature pellet 22 it will deform to fill the inside diameter of mold pot bushing 44. By deforming higher temperature resin pellet 22 in this manner all air or gases trapped within mold pot bushing 44 will be forced out through runners 48 as transfer ram 46 applies force to resin pellets 22, 24 and 26.

The result of using preheating system 30 in cooperation with mold pot 40 is to force any air or gases within mold pot bushing 44 and mold pot 40 out through runners 48 without trapping air or gases in the molding compound represented by resin pellet 20 as it changes from a solid state into an amorphous, viscous state.

Those skilled in the art will readily appreciate that the desired preheat temperature for ends 21 and 22 of pellet 20 is dependent upon the type of molding compound represented by resin pellet 20 and the specific design characteristics of mold assembly 140 including mold pot 40 and mold cavities 42. Typically, resin pellet 20 may be preheated for 20 to 30 seconds between electrodes 31 and 32. A typical temperature for mold assembly 140 including mold pot 40 and mold cavities 42 would be in the range of 150 degrees Celsius to 180 degrees Celsius. Again, the specific temperatures used during the transfer molding process are dependent upon the type of molding compound represented by resin pellet 20.

An important feature of the present invention is that slanted plate 36 may be easily modified to have a different angle for tapered surface 39 to accommodate different desired temperatures and temperature gradients depending upon the type of molding compound represented by resin pellet 20. Slanted plate 36 may be manufactured from any material which has electrical characteristics compatible with electrodes 31 and 32 and is also resistant to corrosion. Aluminum is one material which has been found satisfactory for use in the fabrication of slanted plate 36.

Although the present invention has been described in detail, it should be understood that various changes, substitutions and alterations can be made herein without departing from the spirit and scope of the invention as defined in the following claims.

What is claimed is:

1. A system for preheating a molding compound in the form of a resin pellet and injecting molding compound during transfer molding of integrated circuits comprising:

spatially separated upper and lower electrodes operable to produce an electrical field between the electrodes to preheat a pellet disposed between the electrodes; and a slanted plate attached to the upper electrode having a tapered surface for producing a varying gradient in the electrical field and a varying gradient of the temperature within the pellet, one end of the slanted plate projecting towards the lower electrode with a smaller gap therebetween as compared to the other end of the slanted plate.

2. The system as defined in claim 11 further comprising:

a mold pot having a bushing; and the bushing having dimensions compatible with the preheated pellet whereby the preheated pellet may be placed within the mold pot.

3. The system as defined in claim 2 further comprising:

a transfer ram which contacts the higher temperature end of the preheated pellet within the mold pot bushing; and fluid flow paths from the mold pot which allow air or other gases to escape as the ram contacts the higher temperature end of the pellet and deforms the pellet to match the internal dimensions of the mold pot bushing.

4. The system as defined in claim 1 further comprising a mold pot having runners extending from the lower portion of the mold pot to allow air or other gases within the mold pot to escape, 5. The system according to claim 1, wherein said temperature gradient is established between said lower electrode and said slanted plate, a high temperature portion of said gradient being established adjacent to said slanted plate end defining said smaller gap and a low temperature portion of said gradient being established adjacent to said other end of said slanted plate.

6. The system according to claim 1, wherein said temperature gradient is variable in accordance of an inclination angle of said slanted plate with respect to said upper electrode.

7. A system for preheating resin pellets used during transfer molding of integrated circuits comprising:

an upper electrode with a slanted plate attached thereto having a tapered surface extending from one end of the upper electrode;

a lower electrode which produces an electrical field between the upper and lower electrodes to heat a resin pellet disposed within the electrical field, one end of the slanted plate projecting towards the lower electrode with a smaller gap therebetween as compared to the other end of the slanted plate; and wherein: the tapered surface produces a gradient in the electrical field that establishes in the pellet a high temperature end and a lower temperature end during pellet heating.

8. The system as defined in claim 7 further comprising;

a pair of rollers disposed between the upper electrode and the lower electrode to position the resin pellet relative to the slanted plate; and means for rotating the rollers.

9. The system according to claim 7, wherein said temperature gradient is established between said lower electrode and said slanted plate, said high temperature end of said gradient being established adjacent to said slanted plate end defining said smaller gap and said low temperature end of said gradient being established adjacent to said other end of said slanted plate.

10. The system according to claim 7, wherein said temperature gradient is variable in accordance of an inclination angle of said slanted plate with respect to said upper electrode.

11. A system for preheating a molding compound in the form of a resin pellet and injecting molding compound during transfer molding of an integrated circuit, comprising:

an upper electrode assembly comprising a first electrode surface and a second surface connected to said first surface and angularly inclined with respect to said first surface;

a lower electrode spaced apart from said upper electrode second surface so as to define a pellet processing cavity therebetween, said lower electrode being operable in conjunction with said upper electrode assembly to produce an electrical field to heat a pellet received within said processing cavity, inclination of said upper electrode second surface establishing a narrowing in said processing cavity at a first cavity end relative to an opposite, second cavity end, said inclination promoting establishment of a gradient in said electrical field and a temperature gradient within said processing cavity, said temperature gradient having an elevated temperature region adjacent to said first cavity end and a reduced temperature region adjacent to said second cavity end.

* * * * *